United States Patent [19]

Rolf et al.

[11] 3,925,256

[45] Dec. 9, 1975

[54] METHOD OF SOL MANUFACTURE

[75] Inventors: David A. Rolf; Vernon B. Chance, Jr., both of Shreveport, La.

[73] Assignee: Universal Oil Products Company, Des Plaines, Ill.

[22] Filed: July 15, 1974

[21] Appl. No.: 488,383

[52] U.S. Cl. ............... 252/463; 252/467; 252/472; 252/475; 423/626; 423/627
[51] Int. Cl.² .................... B01J 21/04; B01J 23/26; B01J 23/06; B01J 23/08
[58] Field of Search ........ 252/463, 313 R, 467, 472, 252/475; 423/626, 627

[56] References Cited
UNITED STATES PATENTS 3,535,268  10/1970  Hayes ............................ 252/463 X

*Primary Examiner*—W. J. Shine
*Attorney, Agent, or Firm*—James R. Hoatson, Jr.; Robert W. Welch; William H. Page, II

[57] ABSTRACT

Aluminum metal is digested in hydrochloric acid at conditions to form an alumina sol. The hydrochloric acid is aerated with air to effect a substantial increase in the rate of reaction.

4 Claims, 1 Drawing Figure

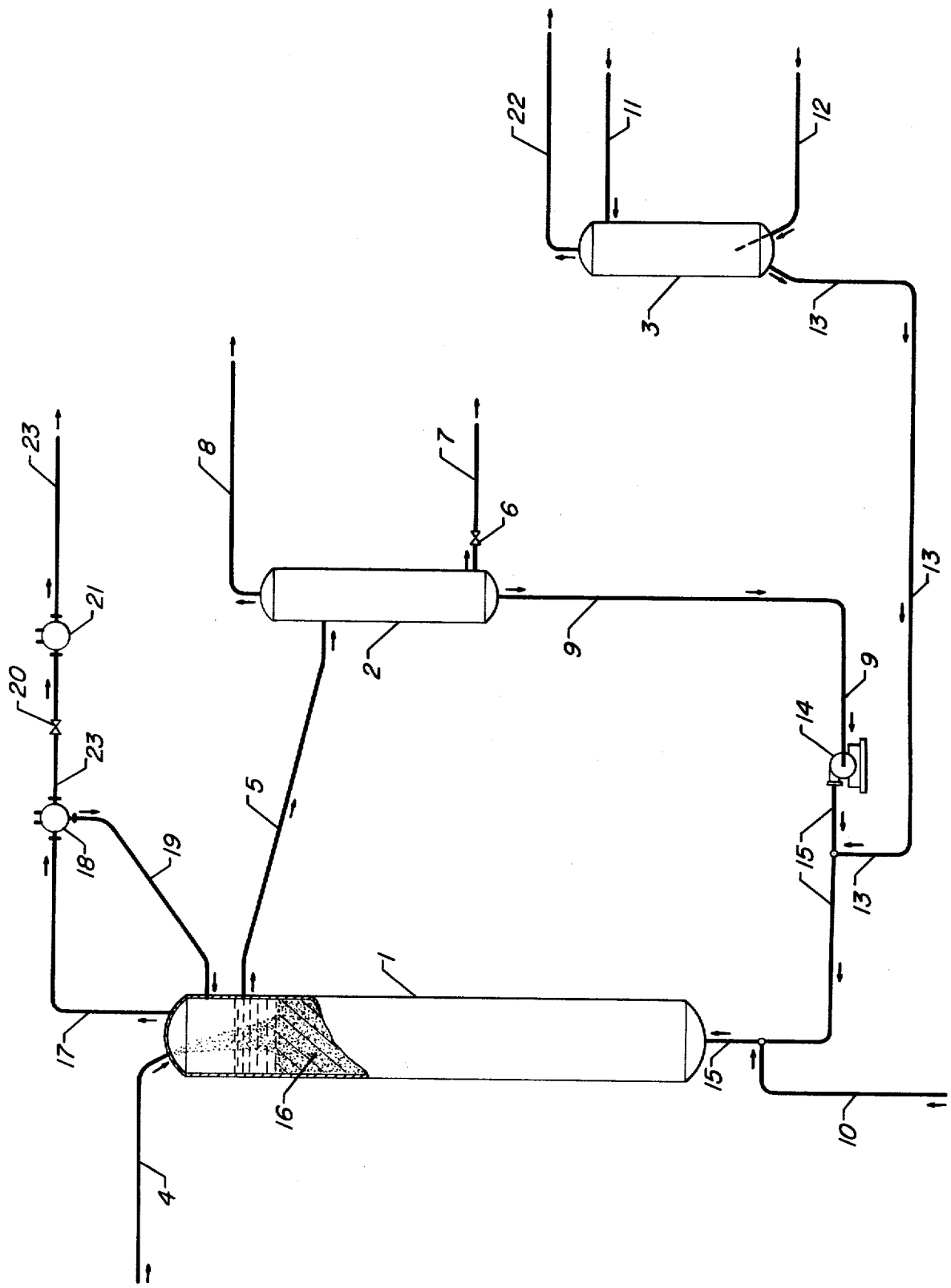

METHOD OF SOL MANUFACTURE

Alumina sols are utilized almost exclusively in the manufacture of alumina. However, the alumina product finds varied and extensive utility, particularly as a dehydrating, treating or purification agent in the chemical and petroleum industries, and more particularly as a catalyst or as a catalyst support in said industries. The sols are typically converted to alumina through a gelation process followed by drying, calcining and miscellaneous process steps. For example, in the manufacture of spheroidal alumina particles suitable for use as a catalyst or catalyst support, it is common practice to disperse the sol as droplets in a hot oil bath whereby gelation occurs with the formation of firm, spheroidal, hydrogel particles. The gelation product is usually subjected to specific aging treatments designed to promote desired physical properties in the alumina product, and the aged spheres subsequently dried at from about 35° to about 240° C. and thereafter calcined at from about 320° to about 750° C.

Frequently, in the manufacture of catalysts comprising alumina, it is desirable to enhance the acidic function of the catalyst by the addition of a chlorine and/or fluorine component thereto. Although the addition can be effected in various ways, including treating of the calcined alumina with hydrochloric and/or hydrofluoric acid, a preferred method comprises utilization of chlorine or fluorine-containing alumina sols prepared by digesting aluminum in hydrochloric or hydrofluoric acid under controlled conditions, and it is an object of this invention to present a novel method of effecting said digestion to substantially increase the rate thereof.

While the method of this invention is described with reference to the digestion of aluminum and the manufacture of alumina sols, it is understood that the method may be similarly employed in the manufacture of other sols normally derived from the digestion of a suitable metal in an acid media. For example, the method may be employed to effect the digestion of chromium, iron, zirconium, zinc, gallium, etc., to form the corresponding sols either per se or in combination with aluminum.

Thus, in one of its broad aspects, the present invention embodies a method of preparing a sol which comprises admixing an oxygen-containing gas with an acid selected from the group consisting of hydrochloric acid and hydrofluoric acid, and contacting the aerated acid with a metal selected from the group consisting of aluminum, chromium, iron, zirconium, zinc and gallium, in a metals digestion zone while maintaining an excess of the metal reactant therein.

One of the more specific embodiments of this invention relates to a method of preparing an alumina sol which comprises admixing air with hydrochloric acid, and contacting the aerated acid with aluminum in a metals digestion zone at a temperature of from about 50° to about 120° C. while maintaining an excess of the aluminum reactant therein.

Other objects and embodiments of this invention will become apparent in the following detailed specification.

While the method of this invention is useful for the manufacture of sols corresponding to the enumerated metals, the method is particularly applicable to the manufacture of alumina sols and the further description of the method of this invention will be presented with respect thereto. The aluminum reactant may be any available commercial grade. However, apart from the improvement of this invention, the aluminum digestion rate is affected by the purity of the aluminum as well as the shape and particle size thereof. Very pure aluminum, say about 99.99 percent pure, reacts rather slowly although the reaction rate is somewhat improved utilizing aluminum turnings or a finely subdivided form of aluminum whereby a maximum surface area is exposed to the acid media. Aluminum globules of about 1/4 inch to about 1 1/2 inch diameter, such as are formed by dropping molten aluminum into water, are a particularly useful form of aluminum. The aluminum digestion rate is substantially increased utilizing a relatively impure aluminum, say from about 99.0 to about 99.9 percent pure, and it is preferred to utilize said aluminum, especially in view of the fact that a substantially pure alumina sol may be produced therefrom by the expedient of passing the sol product through a magnetic field, iron being the principal impurity normally encountered.

Alumina sols of predetermined composition with respect to aluminum and chloride content as well as aluminum/chloride ratio are prepared by the method of this invention. Usually, it is preferred to maintain the chloride level of the sol product at from about 8 to about 13 wt. percent thereof. Sols that contain aluminum in excess of about 16 wt. percent are highly unstable so that it is preferable to maintain the aluminum content at less than about 15 wt. percent. The aluminum/chloride ratio of the sol product, which influences the physical properties of the ultimate alumina product, is usually maintained at from about 0.5 to about 2.0.

The preparation of alumina sol by acid digestion involves adding metered quantities of aluminum, acid and deionized water to a reaction vessel or digester while maintaining an excess of the aluminum reactant therein at all times. The aluminum and chloride content of the sol, as well as the aluminum/chloride ratio thereof, is substantially equivalent to the quantity and ratio in which the aluminum and hydrochloric acid are charged to the digester. The digestion process results in the evolution of hydrogen, and the progress of the reaction can be monitored by the quantity and rate at which hydrogen is evolved as well as by periodic sol analysis.

It has now been found that the rate of aluminum digestion increases dramatically when air or other oxygen-containing gas is admixed with the hydrochloric acid prior to contact with the aluminum reactant. It has been observed that as the volume of air admixed with the acid is increased, the rate of aluminum digestion is also increased up to about 200 percent or more of the normal rate, and as the volume of air is decreased the digestion rate drops off and assumes a normal rate at zero air addition. Thus, it will be appreciated that in addition to accelerating the rate of digestion, the method of this invention is useful to control the digestion rate within certain limits. In a batch type of operation, it is desirable to introduce air into the acid just prior to adding the same to the digester.

The digestion reaction can be effected in a batch type of operation or in a continuous manner. In a batch type of operation, an excess of the aluminum reactant is charged to the digester followed from about 10 to about 37 percent hydrochloric acid in aqueous solution. The reactants are stirred at an elevated temperature and, when the sol composition analyzes a desired aluminum content and aluminum/chloride ratio, the sol is separated from the excess aluminum and transferred to a holding tank for subsequent use. The method of this invention is preferably effected in a continuous type of operation substantially as described in U.S. Pat. No. 3,535,268. Briefly, hydrochloric acid is charged to a digestion zone in admixture with sol recycled thereto, and the mixture is processed through the zone in contact with an excess of aluminum particles maintained therein. A portion of the sol effluent is recovered at a rate to establish a desired average residence time in the digester, and the remaining sol is recycled to the digester in admixture with hydrochloric acid as aforesaid.

The method of the present invention is more specifically described in connection with the accompanying schematic flow diagram which illustrates a continuous type of operation. The simplified flow diagram represents one preferred method of practicing this invention and is not intended as an undue limitation on the generally broad scope of the invention as set out in the appended claims.

The schematic flow diagram shows an aluminum digester 1, a sol receiver 2, and an acid charge tank 3. In a lined-out operation, the digester will contain an inventory of unreacted aluminum pellets 16, said inventory being maintained by a flow of aluminum pellets through line 4 from a feed hopper not shown. The aluminum pellets are charged to the digester at a rate substantially equivalent to the rate of digestion therein. The digester also contains an upwardly flowing acidic mixture which exits from the digester as an aluminum sol through line 5 to be transferred to the sol receiver 2. A liquid level is maintained in the sol receiver by means of a level controller 6 with the sol product being recovered through line 7 at a rate substantially equivalent to product make. An overhead line 8 is provided to vent any gaseous material carried to the receiver 2 by the sol stream. A portion of the alumina sol is continuously withdrawn from the receiver 2 by way of line 9 to be recycled to the digester.

Hydrochloric acid is charged through line 11 to the acid charge tank 3 as an aqueous hydrochloric acid solution containing from about 10 to about 37 wt. percent HCl. Air is charged to the acid charge tank 3 via line 12 and, pursuant to the present invention, admixed with the acid contained therein. The resulting aerated acid is withdrawn from the charge tank through line 13 and combined with the sol in line 15 being recycled to the digester 1 by means of a recycle pump 14. Deionized water is charged to the system by way of line 10, typically in a 1.6–1.7 volume ratio with the hydrochloric acid, and admixed with the hydrochloric acid-sol mixture in line 15. The aerated acid and recycled sol are then processed upwardly through the digester in contact with the aluminum particles maintained therein. Hydrogen formed in the digestion process is taken off through line 17 together with steam and hydrochloric acid, to a condenser 18 which is free draining to the digester through line 19 to minimize the loss of water and acid. Cooled hydrogen is taken through line 23 and a back pressure valve 20 set to maintain a digester pressure in the 0–35 psig range. The hydrogen is discharged through an integrating, totalizing or displacement type flow meter 21 to monitor the hydrogen make, the hydrogen make being substantially stochiometric with the aluminum consumed so as to provide an operating guide as to the degree of completeness of the aluminum digestion.

We claim:

1. A method of preparing a sol which comprises admixing an oxygen containing gas with an acid selected from the group consisting of hydrochloric acid and hydrofluoric acid, and contacting the aerated acid with particles of a metal selected from the group consisting of aluminum, chromium, iron, zirconium, zinc and gallium, in a metals digestion zone while maintaining an excess of the metal reactant therein and maintaining a reaction temperature sufficient to form the sol.

2. The method of claim 1 further characterized in that said metal is aluminum.

3. The method of claim 1 further characterized in that said acid is hydrochloric acid.

4. The method of claim 1 further characterized in that said digestion zone is maintained at a temperature of from about 50° to about 120° C.

* * * * *